United States Patent
Jones

[15] 3,699,554
[45] Oct. 17, 1972

[54] METHOD AND APPARATUS FOR DETECTING BINARY DATA BY INTEGRATED SIGNAL POLARITY COMPARISON

[72] Inventor: William H. Jones, Oklahoma City, Okla.
[73] Assignee: Honeywell Information Systems Inc.

[22] Filed: July 2, 1970
[21] Appl. No.: 51,899

[52] U.S. Cl. ....340/174.1 H, 178/88 R, 340/347 DD
[51] Int. Cl. ....G11b 5/02
[58] Field of Search .340/174.1 G, 174.1 H, 347 DD; 178/88 R

[56] References Cited

UNITED STATES PATENTS

| | | | |
|---|---|---|---|
| 3,217,329 | 11/1965 | Gabor | 340/174.1 G |
| 3,251,047 | 5/1966 | Morley | 340/174.1 G |
| 3,281,806 | 10/1966 | Lawrance et al. | 340/174.1 G |
| 3,311,904 | 3/1967 | Talsoe | 340/174.1 G |
| 3,491,349 | 1/1970 | Sevilla et al | 340/174.1 H |

*Primary Examiner*—J. Russell Gouldeau
*Attorney*—Edward W. Hughes and Fred Jacob

[57] ABSTRACT

An apparatus and a method is disclosed in which binary data is retrieved from a medium on which data is stored. A read signal representative of the binary data is derived, differentiated, and integrated to obtain signals representative of the amplitude and polarity of the differentiated read signal. The integrated signals are compared to obtain the binary value of the data.

7 Claims, 4 Drawing Figures

INVENTOR.
WILLIAM H. JONES

METHOD AND APPARATUS FOR DETECTING BINARY DATA BY INTEGRATED SIGNAL POLARITY COMPARISON

BACKGROUND OF THE INVENTION

This invention relates to a binary data storage and retrieval system and more particularly to methods and apparatus for detection of binary digits from an electrical signal derived from a medium storing signals representing the binary information in the presence of extraneous electrical or noise signals and even though the electrical signal is distorted from its ideal form.

1. Field of the Invention

There are numerous applications in the high speed information processing art that involve the detection of binary digits from low-level electrical information signals in the presence of noise signals and wherein the electrical information signals may be distorted by such noise signals or other conditions. An example of such an application is in the field of storage retrieval systems wherein a relatively high quantity of digital data is extracted from a relatively small portion of a storage medium in a manner whereby the stored data must be accurately retrieved from electrical signals which have frequently been distorted by adjacently stored information in close proximity and by undesirable electrical interference signals.

2. Description of the Prior Art

It is well known in the art that digital information can be stored in a storage medium having a magnetic surface and that information thus stored may be retrieved by providing relative movement between the medium and an electromagnetic transducer. The transducer is capable of sensing or detecting patterns of magnetic polarity changes or transitions between discrete areas on the surface of the storage medium and generating an alternating electrical read signal having alternating polarity corresponding to the patterns of magnetic polarity transitions. This detected pattern of magnetic polarity transitions, or "flux reversals" as they are commonly referred to when interpreted in conjunction with an additional parameter such as time or position, are indicative of the information stored in a plurality of discrete magnetized areas, termed "cells", on the surface of the storage medium. The pattern of magnetic polarity transitions thus detected is commonly referred to as a "code".

One prior art system for storing information on magnetic tape, drums and discs, is based upon a code which is known as a "double frequency" code. The double frequency code involves the use of two frequencies, a unit frequency and a double unit frequency wherein one binary digit is recorded as the absence of a polarity transition and the other binary digit as the presence of a polarity transition with a cell. The recorded information is read by an electromagnetic transducer and associated electronic circuits which produce electrical read signals having analog waveforms with amplitude peaks and nodes indicative of these presences and absences of polarity transitions. The analog waveform is then examined at a predetermined time interval or "-sampling window" corresponding to the transition position with each cell and a digital decision made for the transition position to determine which binary digit is being read at any particular time.

In the above described prior art system, the storage media, transducer and electronic circuits used to record and read the magnetically recorded information, taken together, result in the introduction of a variety of spurious signals referred to collectively as "interference"or "noise". The presence of noise often results in the distortion of read signal waveforms and an associated loss of information. By way of example, spurious signals may result from: (1) cross talk from adjacent cells; (2) media defects; and (3) external sources such as the power supplies that furnish operating potentials to the electronic detection circuits. A problem therefore exists in that noise signals may appear in the read signal at a time corresponding to the sampling window, thus resulting in read errors.

Another crucial problem has existed in the prior art because the read signal is detected at a peak, or a derivative zero-crossover or node position of each cell within a fixed sampling window. This results in errors occurring for high density data detection where, due to pulse crowding effects known as peak shifting and amplitude deterioration, the peak or its derivative zero-crossover has shifted out of the sampling window or the amplitude may be insufficient to allow detecting the presence of a flux transition. Also, at very high densities, mechanical tolerances are critical so that slight variations in speed of the record medium can cause rapid time displacement of the read signal such that sensing at a precise time interval within a sampling window may produce an erroneous detected digit.

SUMMARY OF THE INVENTION

In accord with an aspect of the invention, the actual binary information represented by transitions within each of the succession of cells is sensed or detected and a differentiated alternating electrical read signal is generated so that a read signal portion corresponding to each cell has an envelope which is characteristic of the binary information. The portions are divided into areas and each of the areas is represented by voltages whose amplitudes and polarities are characteristic of the binary information. Electrical sum signals having an amplitude and polarity sense corresponding to areas of each cell are derived by summing or integrating the read signal during successive integration intervals or periods and compared. As a result of the comparison, output signals are provided characterizing the data information represented by the sense of polarities.

The integrator, in a signal detection circuit according to the present invention, provides an output signal which retains a desired polarity when a signal of one polarity containing noise signals of opposite polarity is integrated and the total time duration of the noise signals is less than the time duration of the desired signal. In the illustrated embodiment of the invention, the integration time period is one-half cell time. This type of operation provides for the rejection of high amplitude short-duration spurious signals having periods of less than one half of the integration period. Furthermore, since the total integration period is a long time interval compared to the time interval of a sampling window, the integration output signal is not significantly influenced by pulse crowding effects during any short sampling window time interval. Thus, as a result of summing or integrating the read signal over a time interval of sufficient length within each cell, errors due to peak shifting, amplitude deterioration and interference signals resulting in the prior art are reduced.

It is, therefore, an object of this invention to provide both an improved method and an improved apparatus for the retrieval of stored binary information in the presence of heretofore excessive interference signals.

Another object of the present invention resides in the provision of an improved binary data detection system for retrieving binary data represented in a double frequency code.

Still another object of this invention is to provide a more accurate method and a more reliable apparatus for the retrieval of binary data capable of high density operation.

A still further object is to provide a method and apparatus for the retrieval of binary data using the summation of signal amplitudes and polarities over a period of time.

Yet another object is to provide a method and apparatus for the retrieval of binary data employing signal integration techniques.

A further object is to provide an improved method and apparatus for the retrieval of binary data utilizing polarity comparison.

The invention is pointed out with particularity in the appended claims. However, other objects and advantages, together with the operation of the invention, may be better understood by reference to the accompanying detailed description of the operation.

BRIEF DESCRIPTION OF THE DRAWING

The present invention may be more readily described by reference to the accompanying drawing in which.

DESCRIPTION OF THE PREFERRED EMBODIMENTS

Figure 1:
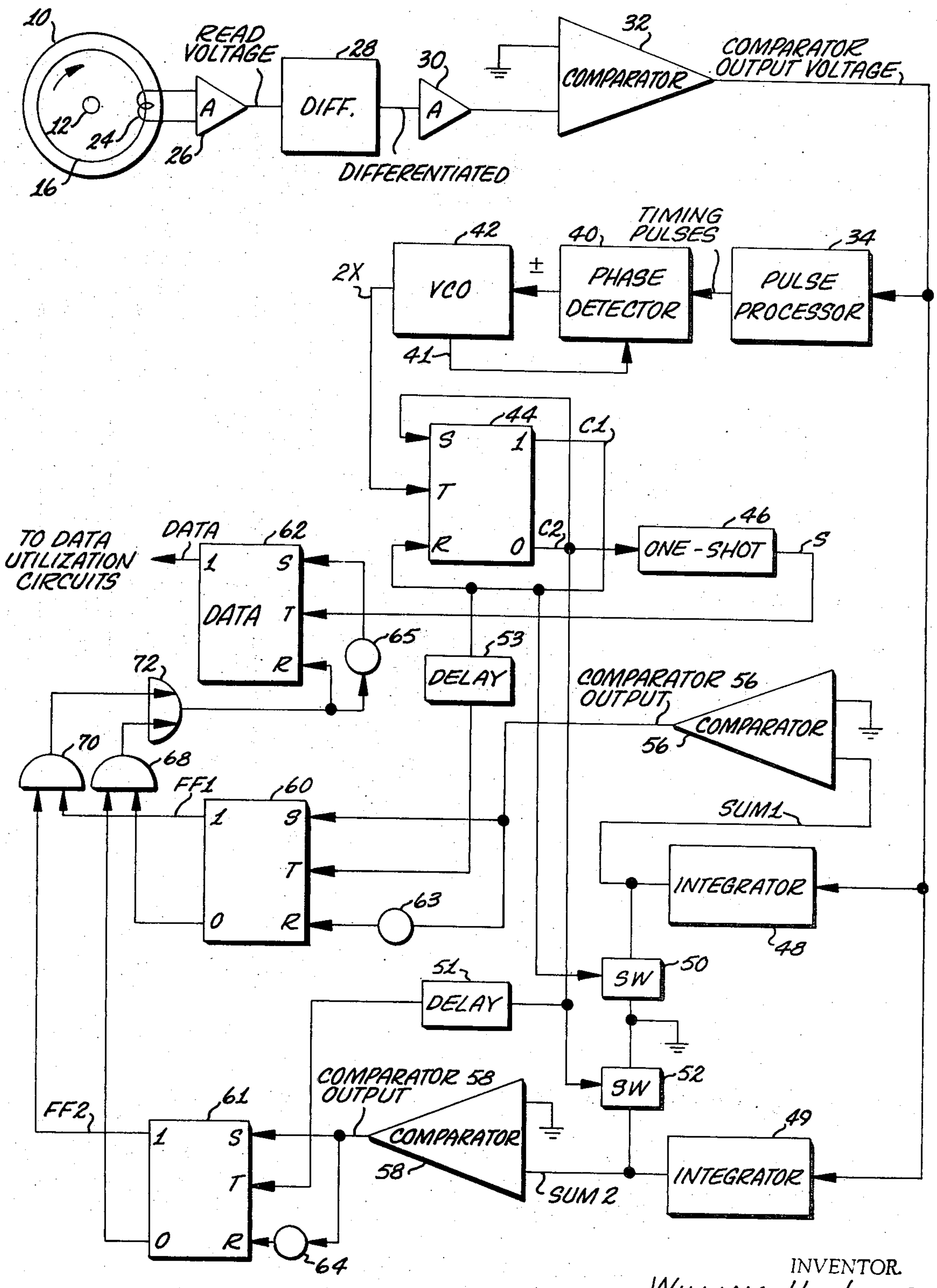
FIG. 1 illustrates a binary data retrieval logic circuit for use with the present invention.
Figure 2:
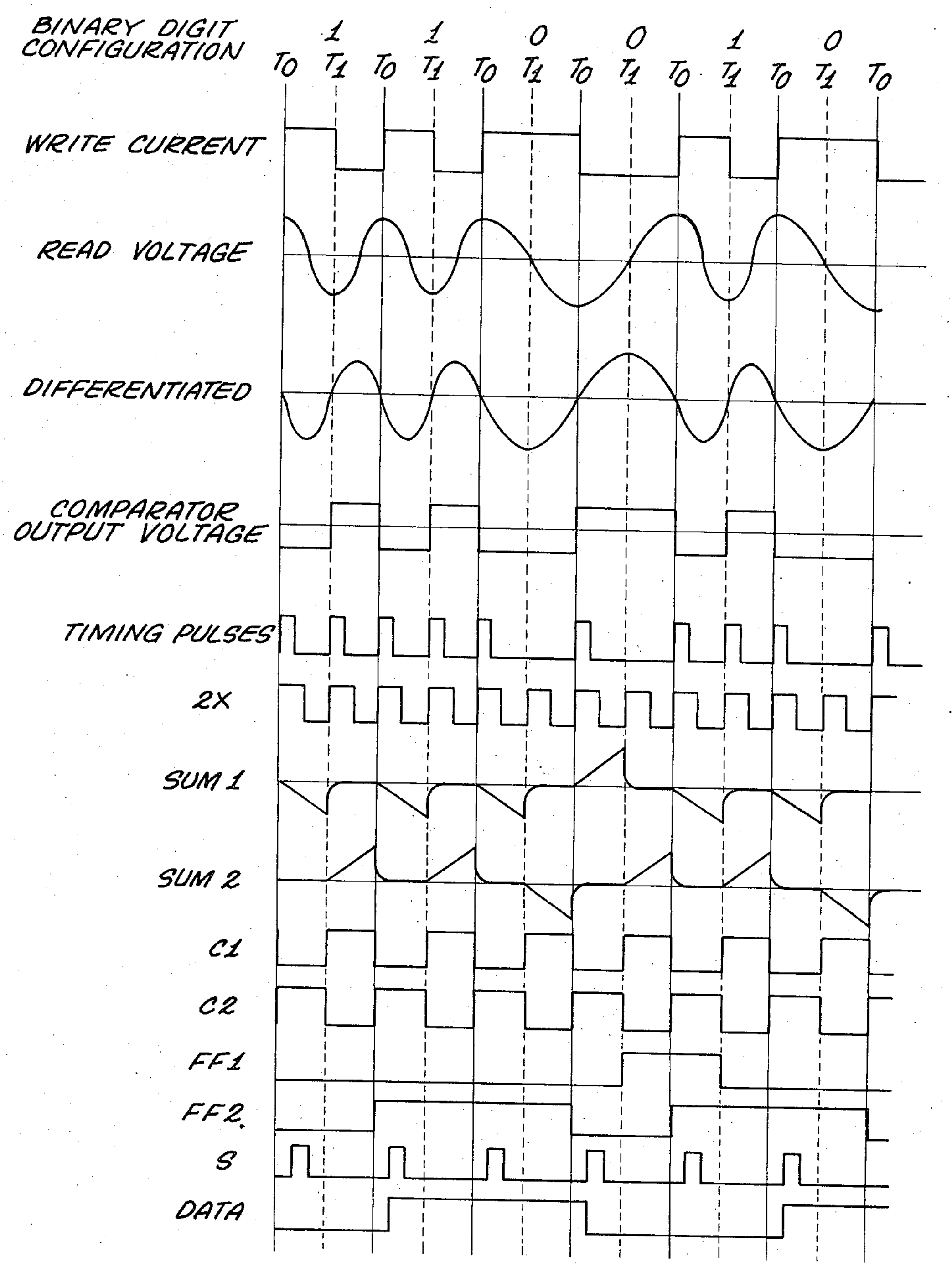
FIG. 2 illustrates recording, retrieval, and timing signal waveforms which occur in the circuit of FIG. 1.

For a more complete understanding of the invention, reference is made to the logic schematic of FIG. 1 and the accompanying timing diagrams illustrated in FIG. 2 by waveforms designated as WRITE CURRENT, READ VOLTAGE, DIFFERENTIATED, COMPARATOR OUTPUT VOLTAGE, TIMING PULSES, 2X, SUM 1, SUM 2, C1, C2, FF1, FF2, S and DATA.

The signals to be described will be referred to as high or enabling signals and low or disabling signals. The logic illustrated is of conventional nature. That is, an AND-gate is a multiple input logic element which provides at its output a high or enabling signal when each of its input signals are high or enabling signals. An OR-gate is a multiple input logic element which provides a high or enabling output signal when one or more of its input signals is a high or enabling signal. The term flip-flop, as used in the present description designates a bistable multi-vibrator with its two stable states being a set state in which there is a binary "1" digit or a high or enabling signal at its "1" output terminal and a reset state in which there is a binary "0" or low or disabling signal at its "1" output terminal.

The type of flip-flop utilized in the present description has three input terminals, an S (Set) terminal, a T (Trigger) terminal, and an R (Reset) terminal. This type of flip-flop is designated as a triggered flip-flop. In this device a high or enabling signal applied to the S terminal simultaneously with a high or enabling signal at the T terminal will place the triggered flip-flop into its set state and a high or enabling signal applied to the R terminal simultaneously with the application of a high or enabling signal at the T terminal will place the triggered flip-flop in its reset state.

A type of one-shot utilized in the present description is a two-state circuit which is normally in a stable reset state. A suitable input signal triggers the one-shot to its astable set state, which state it maintains for a predetermined design period, after which it automatically returns to its reset state. An example of such a one-shot circuit is shown by Abraham I. Pressman in FIG. 11-15 of Design of Transistorized Circuits for Digital Computers, John F. Rider, Publisher, Inc., New York, 1959. Timing Referring now to FIGS. 1 and 2, in FIG. 1 a storage medium 10 in the form of a disc having a magnetizable coating is mounted for rotation in a clockwise direction about an axis 12 by a suitable drive means, not shown. An information track 16 arranged on storage medium 10 is provided for storing intelligence in the form of discrete magnetically polarized areas in a succession of data cells represented in FIG. 2 as cells in the WRITE CURRENT signal having boundaries and midpoints corresponding to times $T_0$ and $T_1$ respectively. A suitable transducer 24 is arranged adjacent to track 16. Relative motion between disc 10 and transducer 24 produces electrical signals on the output of the transducer 24 in response to the changing magnetic polarity of discrete areas on the track. The output signals thus generated are amplified by an amplifier 26 to derive the READ VOLTAGE signal illustrated in FIG. 2. The READ VOLTAGE signal is applied to a differentiator 28. Differentiator 28 produces a DIFFERENTIATED signal which is then amplified in a second amplifier 30. The output of the second amplifier 30 is then applied to an input of a comparator amplifier 32.

One suitable comparator amplifier circuit is described and shown, for example, in Pulse, Digital and Switching Waveforms by J. Millman and H. Taub, McGraw-Hill Book Company, 1965, in FIG. 7-26, p. 257. Comparator amplifier 32 operates such that whenever the level of the signal from amplifier 30 is at a lower level than a 0 volt reference, the output of comparator amplifier 32 will be at a low or disabling level. When the output of amplifier 30 applied to the input of comparator amplifier 32 exceeds the 0 volt threshold level the output of comparator amplifier 32 will be at a high or enabling level. Accordingly, the output of comparator amplifier 32 provides a signal on the comparator output voltage line having a COMPARATOR OUTPUT VOLTAGE waveform as illustrated in FIG. 2. The output of the Comparator Amplifier 32 is applied to a pulse processor 34 and to each of a pair of integrators 48 and 49.

Although the illustrated preferred embodiment employs comparator amplifier 32 to provide a square wave representation of the DIFFERENTIATED signal, it should be understood that the DIFFERENTIATED signal or the output signal from amplifier 30 could also be applied directly to the input of integrators 48 and 49 if it is desirable to integrate a linear analog signal.

The output of phase detector 40 is an error sense voltage which is transmitted to a voltage controlled oscillator 42 whose output signals are as illustrated by the 2X waveform of FIG. 2. The square wave signals 2X have a frequency in the embodiment disclosed of two times the repetition rate of the data cell occurring in the information track 16 (see FIG. 1). The output signals of the voltage controlled oscillator 42 are transmitted via a feedback loop 41 back to the phase detector 40.

Phase detector 40 compares the phase of its input signal from pulse processor 34 with the output signal of the voltage controlled oscillator 42 to provide an output voltage signal, either positive or negative, representative of the difference in phase between these two signals. This output voltage signal is supplied to the voltage controlled oscillator 42 and causes the oscillator 42 to vary its output frequencies such that the output 2X signal is in close synchronism with the basic frequency of the signals being derived from the information track of disc 10. As used herein, the terms information and data are synonymous.

The 2X signal from oscillator 42 is transmitted to a T input terminal of a flip-flip 44. The 2X signal applied to the T input terminal of flip-flop 44 provides for controlling the setting and resetting of flip-flop 44 for generating C1 and C2 output signals from the 1 and 0 output terminals respectively, as illustrated by the C1 and C2 waveforms of FIG. 2.

The C2 output signal is applied to a monostable multivibrator or one-shot 46 to provide an S output pulse as illustrated by the S waveform in FIG. 2. The C1 output pulse is transmitted to a switch 50 and through a suitable delay means 53 to a T input terminal of a flip-flop 60. Similarly, the C2 output pulse is transmitted to a switch 52 and through a suitable delay means 51 to a T input terminal of a flip-flop 61. Switches 50 and 52 may be, by way of example, field effect transistor switches designed to operate during the presence and absence of high or enabling C1 and C2 signals respectively. The C1 and C2 signal pulses are used for storing an integrated COMPARATOR OUTPUT VOLTAGE signal or a SUM 1 signal at a time corresponding to the end of the first half of a cell and an integrated COMPARATOR OUTPUT voltage signal or a SUM 2 signal at a time corresponding to the end of the second half of a cell in a manner to be described hereinafter.

Read logic for retrieving information recorded in the double frequency code is illustrated in FIG. 1 comprising a pair of integrators 48 and 49, comparator amplifiers 56 and 58, switches 50 and 52, delay means 51 and 53, flip-flops 60–62, inverters 63–65, AND-gates 68 and 70 and an OR-gate 72.

The output signal from comparator amplifier 32 is applied directly to each of integrators 48 and 49, as illustrated in FIG. 1. The COMPARATOR OUTPUT VOLTAGE waveform will alternate between a positive and negative polarity amplitude to represent the positive and negative polarity of magnetization in each of six cells illustrated in FIG. 2. Integrators 48 and 49 are well-known integrator circuits of the type described and shown, for example, in Electronic Analog Computers by Granino A. Korn and Theresa M. Korn, Second Edition, McGraw Hill Book Co., Inc. 1956, FIG. 4.11, p. 166. Each integrator integrates the COMPARATOR OUTPUT VOLTAGE signal for a time interval corresponding to one-half cell time as controlled by switches 50 and 52.

Switch 50 operates in response to a low or disabling C1 signal to disconnect a ground or zero potential from the output of integrator 48 to control integration of a portion of the COMPARATOR OUTPUT VOLTAGE signal during a time interval corresponding to a first half cell area. Similarly, switch 52 operates in response to a low or disabling C2 signal to disconnect a ground or zero potential from the output of integrator 49 to control integration of a portion of the COMPARATOR OUTPUT VOLTAGE signal during a time interval corresponding to a second half cell area. Integrators 48 and 49 therefore function in conjunction with switches 50 and 52 to provide a set of sum signals for each cell area identified in FIG. 1 as SUM 1 and SUM 2 signals.

The polarity and amplitude of each integrated signal portion is representative of the area of that COMPARATOR OUTPUT VOLTAGE signal portion corresponding to a first or a second half cell area. The SUM 1 and SUM 2 signals therefore have an amplitude and polarity corresponding to the summation of a quantity of the pattern of magnetization within each of the first and second halves of each cell. SUM 1 and SUM 2 signals are then utilized by comparator amplifier 56 and comparator amplifier 58 respectively to generate signals for storing in storage flip-flops 60 and 61.

Operation-Double Frequency Code

Operation-Double Frequency Code

A binary digit configuration recorded in a double frequency code suitable for detection by the read logic to be described hereinafter is illustrated in FIG. 2 by means of a WRITE CURRENT waveform. FIG. 2 illustrates by means of a WRITE CURRENT waveform the flux reversal positions or patterns of representations which would be written onto a magnetic recording surface for a six binary digit configuration of 110010, as read from left to right. These six bits are stored in six respective cells. For example, a binary "1" is recorded as a flux reversal at the $T_0$ and $T_1$ time positions of the first cell, and the binary "0" is recorded as a flux reversal only at the $T_0$ position of a third cell. The WRITE CURRENT waveform represents an idealized signal current waveform which may be applied to a recording head winding of a transducer in order to store on a suitable media, magnetization patterns representing the binary digit configuration.

FIG. 2 illustrates by means of a READ VOLTAGE waveform a resultant alternating electrical read signal voltage waveform corresponding to the flux reversal pattern illustrated by the WRITE CURRENT waveform. The READ VOLTAGE waveform may be obtained from a transducer or sensing means sensing the flux reversal pattern. The DIFFERENTIATED waveform illustrates the READ VOLTAGE waveform following differentiation. The zero crossover points and peaks of the READ VOLTAGE waveform are illustrated in the DIFFERENTIATED waveform as peaks and zerorcrossover points respectively. FIG. 2 further illustrates by means of the COMPARATOR OUTPUT VOLTAGE waveform, the DIFFERENTIATED waveform following application to comparator amplifier 32 to provide a square wave representation of the DIFFERENTIATED waveform.

Thus, with reference to FIG. 2, assuming that the binary digit configuration illustrated is to be read from 6 cells reading from left to right, a first high or enabling C2 signal pulse at a $T_0$ time of a first cell, enables switch 52 for connecting a ground or zero level potential to the output of integrator 49. This resets integrator 49 by providing a controlled discharge path to ground for an integrating capacitor (not shown) within integrator 49. Simultaneously, a low or disabling C1 signal is applied to switch 50 to disable or open the switch, thereby disconnecting the ground or zero level output connection to integrator 48. Thus, integrator 48 is placed in a condition for integrating a portion of the COMPARATOR OUTPUT VOLTAGE representing a first-half area of the first cell.

Beginning at the $T_0$ time of the first cell, a negative polarity COMPARATOR OUTPUT VOLTAGE signal is present and therefore integrator 48 produces a SUM 1 signal having a negative saw-tooth waveform representing a first half area of the first cell. With reference to FIG. 2, the SUM 1 signal from integrator 48, at a time equal to the occurrence of a high or enabling C1 signal and a low or disabling C2 signal, is at a negative peak signal level of a negative saw-tooth waveform.

Still referring to FIG. 2, the SUM 1 output signal from integrator 48 during the first half time of the first cell, when applied through comparator amplifier 56, results in a low or disabling signal from comparator amplifier 56. Comparator amplifier 56 operates in a manner similar to that previously described for comparator amplifier 32 and in a delayed response manner to be described hereinafter with reference to FIG. 3.

Thus, when the first high or enabling C1 output pulse illustrated in FIG. 2 and delayed a time interval D through a suitable delay means 53, is applied to the T input terminal of a storage flip-flop 60 a point on the COMPARATOR 56 OUTPUT signal waveform corresponding to the peak of the SUM 1 signal will be examined for storing a polarity indication in flip-flop 60. The output signal from comparator amplifier 56 is at a low or disabling level since the SUM 1 signal from integrator 48 is at a negative level. FOllowing inversion through inverter 63, a high or enabling signal is applied to the R input terminal of storage flip-flop 60. Thus, with the conjunctive occurrence of the delayed high or enabling C1 signal applied to the T input terminal and the high or enabling C1 signal at the R input terminal of flip-flop 60, flip-flop 60 will be placed in a reset state. Flip-flop 60 being in a reset state provides output signals indicating a negative polarity during a time corresponding to the first half of the first cell.

Also the first high or enabling C1 signal pulse, which occurred at the beginning of a second half of the first cell, is applied to switch 50 to enable switch 50 to provide for connecting a ground or zero level potential to the output of integrator 48 thereby resetting integrator 48. Simultaneously the C2 signal is at a low or disabling level which disables switch 52 thereby removing a ground or zero level potential from the output of integrator 49. Integrator 49 is thereby conditioned to integrate the COMPARATOR OUTPUT VOLTAGE signal during a second half cell time interval. Since the COMPARATOR OUTPUT VOLTAGE signal is at a high or enabling level representing a positive polarity at the occurrence of the low or disabling C2 signal pulse, integrator 49 integrates the high or enabling COMPARATOR OUTPUT VOLTAGE signal to provide a SUM 2 output signal having a positive saw-tooth waveform as illustrated in Figure 2.

Figure 3:
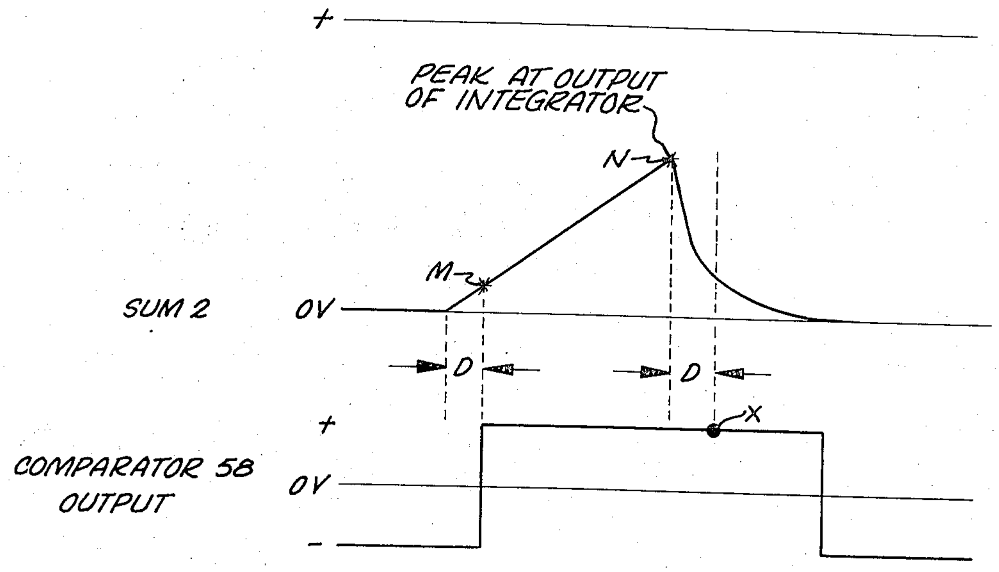
FIG. 3 illustrates an enlarged fragmentary representation of a sum signal waveform and a comparator output signal waveform of FIG. 2.

With reference to FIG. 3 to explain in more detail the question of the integrator circuit beginning at a time corresponding to a delay of D, the output signal from comparator amplifier 58 as at a high or enabling level. The positive polarity SUM 2 output signal from integrator 49 increases to represent a summation of an area defined by the COMPARATOR OUTPUT VOLTAGE amplitude until reaching a peak at the time of occurrence of a next high or enabling C1 signal. The high or enabling C2 signal enables switch 52 to again reset integrator 49 for reducing the SUM 2 output signal from its peak level to a zero volt level. Following a delay time D, the COMPARATOR 58 OUTPUT signal will still be at a high or enabling level for applying to the S input terminal of flip-flop 61 in conjunction with a delayed high or enabling C2 signal through a suitable delay means 51 to the T input terminal of flip-flop 61. Flip-flop 61 is thereby placed in a set state. Thus, a positive polarity indication is stored in flip-flop 61 as corresponding to the time period of the second half of the first cell.

Referring to FIG. 1, following the C1 and C2 signal pulses corresponding to the first cell and the C2 pulse corresponding to the second cell, the storage flip-flops 60 and 61 will contain a 01 bit configuration indicating the detection of a negative polarity during the first half and the detection of a positive polarity during the second half of the first cell. Comparator amplifiers 56 and 58, delays 51 and 53, flip-flops 60 and 61, AND-gate 68 and 70, OR-gate 72 and inverters 63-65 provide what may be referred to as a comparison means which compares the polarity indications which have been stored in the storage flip-flops 60 and 61 to determine the binary digit which has been read from a cell. The indications stored in flip-flops 60 and 61 are now compared by AND-gates 68 and 70 to determine whether a binary "1" digit value or a binary "0" digit value has been read from the first cell.

Since flip-flop 61 is in a set state, a low or disabling output signal will be applied from its 0 output terminal to one input of AND-gate 68 to disable AND-gate 68 and since flip-flop 60 is in a reset state, a low or disabling FF1 output signal from its 1 output terminal is applied to one input of AND-gate 70 to disable AND-gate 70. AND-gates 68 and 70 being disabled will provide low or disabling output signals to each input of OR-gate 72 to disable OR-gate 72, thereby providing a low or disabling output signal from OR-gate 72. The low or disabling output signal from OR-gate 72 is inverted through inverter 65 to provide a high or enabling signal to the S input terminal of a DATA flip-flop 62.

The transfer of the digit value of the first cell into DATA flip-flop 62 is accomplished during the first half of the second cell. At the occurrence of a high or enabling C2 signal pulse in the first half of a second cell, one-shot 46 is triggered to its astable state to provide a high or enabling S pulse as illustrated by the S waveform of FIG. 2. One-shot 46 may have a guaranteed delay such that each S pulse appears at substantially a midpoint of each high or enabling C2 pulse. The high or enabling S pulse is applied to the T input terminal of DATA flip-flop 62 in conjunction with the enabling signal present at its S input terminal to place DATA flip-flop 62 in a set state indicating that a binary "1" digit has been read from the first cell. With DATA flip-flop 62 in a set state, a high or enabling signal is provided at its one output terminal on the DATA line to data utilization circuits which may be, by way of example, part of a data processing system utilizing the data being read. Thus, following each high or enabling C2 signal pulse, an S pulse is generated and utilized for controlling the state of DATA flip-flop 62. The DATA flip-flop 62 provides a signal on the DATA line indicative of the reading of a binary "1" digit or a binary "0" digit from a cell.

Similarly, for the second cell with the appearance of high or enabling C2 and C1 signals successively, integrators 48 and 49 alternately integrate the COMPARATOR OUTPUT VOLTAGE signal to provide a negative and a positive polarity saw-tooth signal respectively to permit storing a 01 configuration into storage flip-flops FF1 and FF2. A binary "1" digit signal is thereby again detected. The binary "1" digit signal of the second cell is transferred into the DATA flip-flop 62 during the first half of the third cell in the manner previously described.

Still referring to FIGS. 1 and 2, the third cell contains a binary "0" such that at the appearance of a low or disabling C1 signal, integrator 48 integrates a low or disabling COMPARATOR OUTPUT VOLTAGE signal for a first half cell to provide a negative polarity SUM 1 output signal having a negative saw-tooth waveform. The negative polarity SUM 1 output signal is applied to comparator amplifier 56 which provides a low or disabling level COMPARATOR 56 OUTPUT signal for inversion through inverter 63 to apply a high or enabling signal to the R input terminal of flip-flop 60. At the occurrence of the next high or enabling C1 signal pulse, which is delayed through delay means 53 and applied to the T input terminal of flip-flop 60, flip-flop 60 will be placed in a reset state. Thus, a negative polarity indication is stored in flip-flop 60 as corresponding to the time period of the first half of the third cell.

At the appearance of the next low or disabling C2 signal, during a second half of the third cell, integrator 49 integrates the low or disabling COMPARATOR OUTPUT VOLTAGE signal to provide a SUM 2 signal with a negative saw-tooth waveform. The negative saw-tooth waveform provides a low or disabling COMPARATOR 58 OUTPUT signal from comparator amplifier 58 which is inverted through inverter 64 to apply a high or enabling signal to the R input terminal of flip-flop 61. At the beginning of the fourth cell a high or disabling C2 signal pulse applied through delay 51 to the T input terminal of flip-flop 61 in conjunction with the high or enabling input signal to the R input terminal places flip-flop 61 in a reset state. Thus, a negative polarity indication is stored in flip-flop 61 as corresponding to the time period of the second half of the third cell.

Storage flip-flops 60 and 61 both being in a reset state will provide high or enabling output signals from their zero output terminals to a respective input to AND-gate 68 thereby enabling AND-gate 68. Enabled AND-gate 68 provides a high or enabling signal to one input of OR-gate 72 for enabling OR-gate 72 to provide a high or enabling output signal to the R input terminal of DATA flip-flop 62. The high or enabling C2 signal provided at the beginning of the first half of the fourth cell is applied to one-shot 46. One shot 46 provides an S pulse, as illustrated in FIG. 2, to the T input terminal of the DATA flip-flop 62. Data flip-flop 62 is thereby placed in a reset state providing a low or disabling signal from its 1 output terminal on the DATA line to data utilization circuits indicating that a binary "0" digit has been read from the third cell.

In a similar manner as that just explained, a binary "0" will be read for the fourth cell with the exception of storing a "11" bit configuration in flip-flops 60 and 61 and the enablement of AND-gate 70 instead of AND-gate 68. A binary "1" will be read for the fifth cell as previously described for cells 1 and 2, and a binary "0" will be read for the sixth cell in the manner previously described for the third cell.

With reference to FIG. 3 along with FIG. 1 a point X on a COMPARATOR 58 OUTPUT signal waveform is illustrated as corresponding to the peak of a SUM 2 signal having a positive polarity sense at a delay time D following the occurrence of the peak at the output of integrator 49. The time of occurrence of the point X represents an optimum time for storing the SUM 2 signal into flip-flop 61. For the case of a negative polarity SUM 2 signal the waveforms of FIG. 3 would be merely inverted. The time interval D indicates the delay time previous described for response following the application of a positive polarity SUM 2 signal at the input of comparator amplifier 58. Therefore, a delay time D from the beginning of a saw-tooth waveform to a point M represents the response time of comparator 58 to provide a high or enabling output signal. Similarly, following the peak signal level at the output of integrator 49, a delay of time D takes place after the appearance of the peak N at the output of the integrator. After time D elapses, the amplitude and polarity of the sum signal is sensed, such that the C2 signal delayed through suitable delay 51 appears at a proper time to enter the COMPARATOR 58 OUTPUT signals into storage flip-flop 61. The delayed C2 signal thus occurs at times corresponding to the occurrence of the peak signal levels of the SUM 2 signal. The circuit comprising integrator 48, comparator amplifier 56, delay 53 and flip-flop 60 functions similarly to store indications representative of the polarity of the peak signal levels of the SUM 1 signal.

Figure 4:
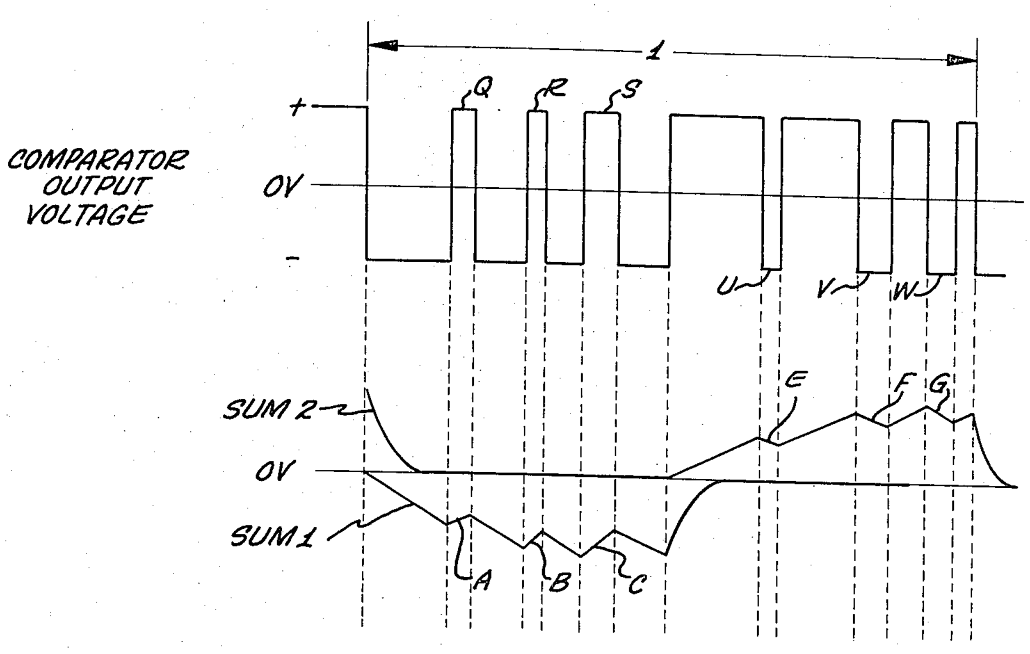
FIG. 4 illustrates enlarged fragmentary representations of sum signal waveforms and a comparator output signal waveform of FIG. 2 during the occurrence of interference signals.

With reference to FIG. 4, the SUM 1 and SUM 2 signals from integrators 48 and 49 are illustrated as corresponding to a COMPARATOR OUTPUT VOLTAGE waveform representing a cell containing a binary "1" digit. The COMPARATOR OUTPUT VOLTAGE waveform is illustrated as having noise pulses appearing as positive pulses Q, R and S within a negative first half of a cell and negative pulses illustrated as U, V and W within a positive half of a cell. The cell is shown storing a binary "1" digit. During the negative one-half cell time, the presence of the positive Q, R and S pulses will each result in a corresponding positive integration interval. Accordingly, the Q, R and S positive polarity noise signals will provide an additive effect on the SUM 1 signal at the output of integrator 48. For example, the negative integrated SUM 1 signal will, during the interval of time duration for the Q positive noise pulse, experience a positive integration interval A which will increase the negative signal level of the SUM 1 signal. The positive R and S noise pulses will similarly result in corresponding positive integration intervals identified as B and C on the SUM 1 waveform thereby increasing the negative SUM 1 output signal level. The overall output summation or integration result of the COMPARATOR OUTPUT VOLTAGE signal by integrator 49 will be a positive polarity signal even with the presence of the U, V and W negative pulses. Again it is seen that for a positive one half cell time, it is necessary for the total negative noise pulse duration to exceed one fourth cell time duration before the SUM 2 output signal will have a negative or incorrect polarity.

Accordingly, by integrating over an entire one half cell time the overall summation or integrated COMPARATOR OUTPUT VOLTAGE signal will not be adversely affected by the occurrence of a noise pulse which may be detected within a narrow precise time sampling window unless it is present for a period of time equal to or greater than one half of the integration period. The saw-tooth shaped waveform of the SUM 1 and SUM 2 signals will each have a final polarity and final amplitude proportional to the summation of the positive and negative pulse periods within one half of a cell. Similarly, peak shifting, as encountered due to pulse crowding effects, may cause shifting of a peak or zero crossover point from a cell midpoint into a first or a second half of a cell time of approximately one-quarter cell time, without resulting in a polarity indication error. Thus, a series of noise pulses having a total duration of at least one quarter of a cell time or a peak shifting of at least one quarter of a cell time is necessary before errors occur in the detection of a correct polarity indication corresponding to the magnetic flux in a first or a second half of cell.

The present invention is readily adaptable to recognition of binary data recorded in a phase modulation code by merely replacing AND-gates 68 and 70, OR-gate 72 and inverter 65 with a different comparison circuit. A different comparison circuit suitable for use may be by way of example, the circuit as illustrated in FIG. 3 of a U.S. patent application by James P. Lipp and William H. Jones, filed May 28, 1970, Ser. No. 41,493 for a Method and Apparatus for Detecting Binary Data by Polarity Comparison and assigned to the same assignee as the present invention. In the phase modulation code, the binary "1" digit may be represented by a positive polarity indication for a first half cell time period or vice versa. The binary "0" digit would then be represented by a negative polarity indication for a first half cell time period and a positive polarity indication for a second half cell time period or vice versa depending upon which convention is selected to represent the binary "1" digit.

The present invention is also readily adaptable for employment with any recording code which is recognized by the presence or absence of representations or transitions such as may be at a plurality of predetermined positions within a cell. The integration periods would be of time durations such that a plurality of integrations and resulting sum signals are obtained whereby each set of two sum signals would be examined to determine the presence or absence of each transition and the resulting pattern of detected transitions decoded to determine the binary digits read from each cell.

Further, the present invention provides a method of detecting binary digits as implemented by the double frequency read logic previously described wherein during a first step a first sum signal is generated which is indicative of the amplitude and polarity corresponding to the summation of the pattern of representations or magnetization within a first half cell area. During a second step a second sum signal is generated which is indicative of the amplitude and polarity corresponding to the summation of the pattern of representation or magnetization within a second half cell area. In a third step, the first and second sum signals are compared and upon achieving a comparison in accordance with the code to be recognized, a fourth step is employed to generate an output signal indicative of a binary digit value. The method of binary data retrieval and error detection is thus achieved by signal amplitude summation and polarity detection.

Referring to FIG. 1 the first step of generating a first sum signal is accomplished by integrator 48 and the second step of generating a second sum signal is accomplished by integrator 49. The third step of comparing is achieved by storage flip-flops 60 and 61, AND-gates 68 and 70, OR-gate 72, inverters 63-65, and their associated delays and comparator amplifiers. Finally, the fourth step of generating an output signal is provided by flip-flop 62 and associated one-shot 46.

With reference to FIG. 2, at a time midway between successive S pulses starting with the second cell, the FF1 and FF2 signals are always of opposite signal levels. This characteristic may be conveniently utilized to detect errors or provide information concerning timing to the data utilization circuits for use in determining the proper time for sampling the DATA signal, in a manner which is immaterial to an understanding of the present invention.

While the principles of the invention have now been made clear in an illustrative embodiment, there will be immediately obvious to those skilled in the art many modifications of structure, arrangement, proportions, the elements, materials and components used in the practice of the invention and otherwise, which are particularly adapted for specific environments and operating requirements without departing from those principles. The appended claims are, therefore, intended to cover and embrace any such modifications, within the limits only of the true spirit and scope of the invention.

I claim:

1. A method of producing output signals indicative of binary information stored in a succession of cells on a single track of a record medium in a pattern of representations corresponding to a succession of binary digits, comprising the steps of:

generating an alternating electrical signal having an alternating amplitude and polarity corresponding to said pattern of representations;

integrating said generated electrical signal during a time interval corresponding to the first half only of each cell of said succession of cell to generate a first sum signal having a polarity determined by said pattern of representations with the first half of said cell;

integrating said generated electrical signal during a time interval corresponding to the second half only of each cell of said succession of cells to generate a second sum signal having a polarity determined by said pattern of representations within the second half of said cell;

comparing said integrated first and second sum signals for a corresponding cell;

generating an output signal having a first digit value when said compared first and second sum signals have the same polarity; and generating an output signal having a second digit value when said compared first and second sum signals have different polarities.

2. A method of producing output signals indicative of binary digits, comprising the steps of:

generating an alternating electrical signal having an alternating amplitude and alternating first and second polarity of opposite sense corresponding to a pattern of representations representing a succession of binary digits stored in a succession of cells of a single track of a record medium moved relative to a transducer;

differentiating said generated alternating electrical signal for providing a differentiated signal having an alternating amplitude and alternating first and second polarities of opposite sense corresponding to said pattern of representations;

integrating said differentiated signal for a first time interval corresponding to the time during which a first half cell of each of said succession of cells is moved relative to said transducer;

generating in response to said integration a first sum signal for each first half cell having an amplitude and polarity sense indicative of the summation of the amplitude of a portion of said differentiated signal corresponding to the pattern of representations occurring only within a first half cell;

integrating said differentiated signal for a second time interval corresponding to the time during which a second half cell of each of said succession of cells is moved relative to said transducer;

generating in response to said integration during said second time interval a second sum signal for each second half cell having an amplitude and polarity sense indicative of said differentiated signal corresponding to the pattern of representations occurring only within a second half cell;

comparing the sense of the polarities indicated by said generated first and second sum signals;

generating an output signal having a first binary value when said compared first and second sum signals have the same polarity; and generating an output signal having a second binary value when said compared first and second sum signals have different polarities.

3. A data detection system for producing an output signal indicative of binary information stored in a succession of cells on a medium in a pattern of representations corresponding to binary digits, said data detection system comprising:

sensing means for generating an alternating electrical signal in response to said pattern of representations;

differentiating means receiving said alternating electrical signal, for differentiating said alternating electrical signal;

integrating means receiving said differentiated signal, for integrating said differentiated signal to generate a first sum signal having a polarity and amplitude determined by said differentiated signal over the first half only of each cell of said succession of cells and to generate a second sum signal having a polarity and amplitude determined by said differentiated signal over the second half only of each cell of said succession of cells; and comparison means receiving said first and second sum signals for a corresponding cell for generating a binary output signal having a first value when said first and second sum signals have the same polarity.

4. A binary data detection system comprising:

sensing means for generating an alternating electrical signal corresponding to a succession of binary digits stored in a succession of cells on a record medium;

differentiating means for receiving said alternating electrical signal and for differentiating said alternating electrical signal;

integrating means for receiving said differentiated signal and for integrating said differentiated signal to generate a first sum signal for each first half cell of said succession of cells indicative of one of two polarities of opposite sense and having an amplitude corresponding to a summation of said pattern of representations within a first half only of each of said cells and to generate a second sum signal for each second half cell of said succession of cells indicative of one of two polarities of opposite sense and an amplitude corresponding to a summation of said pattern of representations within a second half only of each of said cells; and comparison means for receiving said first and second sum signals for a corresponding cell and being responsive to the sense of the polarities indicated by the generated first and second sum signals for a corresponding cell to generate an output signal indicative of the binary digit value.

5. A binary data detection system comprising:

sensing means for generating an alternating electrical signal corresponding to a succession of binary digits stored in a succession of cells on a record medium;

differentiating means for differentiating said alternating electrical signal;

integrating means for receiving said differentiated signal and for integrating said differentiated signal to generate a first sum signal for each first half cell of said succession of cells indicative of one of two polarities of opposite sense and having an amplitude corresponding to the summation of the polarity and amplitude of a pattern of representations occurring only within a first half of each of said cells and to generate a second sum signal for each second half cell of said succession of cells indicative of one of two polarities of opposite sense and having an amplitude corresponding to the summation of the polarity and amplitude of said differentiated signal representing a pattern of representations occurring only within a second half of each of said cells; and comparison means responsive to said generated first and second sum signals of like polarity to generate a first output signal and responsive to said generated first and second sum signals of unlike polarity to generate a second output signal.

6. A magnetic reproducing system comprising:

a sensing means for deriving an alternating electrical signal having a first and second frequency with alternating first and second polarity corresponding to a pattern of magnetization of a record medium having binary information stored within successive cells thereof, one half cycle of said first frequency corresponding to magnetization of one of said first and second polarities of opposite sense representing a first binary digit value and one full cycle of said second frequency corresponding to magnetization of an alternation from said first to second polarity between first and second halves of the cell representing a second binary digit value wherein a polarity reversal occurs at a boundary between each of said successive cells;

clock generating means connected to said sensing means for receiving said alternating signals and being responsive to said alternating signal to generate first and second periodic clock signals, said first periodic clock signals occurring at times corresponding to a midpoint position of each of said cells, and said second periodic clock signal occurring at times corresponding to a boundary position between each of said cells respectively;

a first integration means connected to said sensing means for receiving said alternating signal and being responsive to said alternating signal to generate a first sum signal for each first half cell of said succession of cells indicative of one of said first and second polarities and the summation of the amplitude of said alternating signal corresponding to the magnetization of said record medium within a first half of each of said cells;

a second integration means connected to said sensing means for receiving said alternating signal and being responsive to said alternating signal to generate a second sum signal for each of said cells of said succession of cells indicative of one of said first and second polarities and having an amplitude corresponding to the summation of the amplitude of said alternating signal corresponding to the magnetization of said record medium within a second half of each of said cells of said succession of cells;

storage means connected to said summing means and said clock generated means to receive said first sum signal and first clock signals and being responsive to said first sum signal and said first clock signal for storing an indication representing the sense of polarity of said first sum signal;

storage means connected to said second summing means and said clock generating means to receive said second sum signal and said second clock signals and being responsive to said second sum signal and said second clock signals for storing an indication representing the sense of polarity of said second sum signal; and comparison means connected to said first and second storage means for receiving said stored indications and being responsive to said stored indications to generate a first output signal indicative of a first binary digit value and being responsive to stored indications representing the sense of polarities of said first and second sum signals of a corresponding cell indicative of unlike sense of polarity to generate a second output signal indicative of a second binary digit value.

7. The apparatus of claim 6 wherein said first and second integrating means are connected to said clock generating means to receive said first and second clock signals respectively, said first integrating means being responsive to said first clock means to inhibit generating said first sum signal and said second integrating means being responsive to said second clock signal to inhibit generating said second sum signal.

* * * * *